(12) United States Patent
Baeg et al.

(10) Patent No.: US 9,091,535 B2
(45) Date of Patent: Jul. 28, 2015

(54) 3D SCANNING SYSTEM AND METHOD OF OBTAINING 3D IMAGE

(71) Applicant: KOREA INSTITUTE OF INDUSTRIAL TECHNOLOGY, Cheonan-si, Chungcheongnam-do (KR)

(72) Inventors: Seung-Ho Baeg, Anyang-si (KR); Sang-Deok Park, Seoul (KR); Jin-Ok Shin, Ansan-si (KR); Kuk Cho, Ansan-si (KR)

(73) Assignee: KOREA INSTITUTE OF INDUSTRIAL TECHNOLOGY, Cheonan-Si, Chungcheongnam-Do (KR)

( * ) Notice: Subject to any disclaimer, the term of this patent is extended or adjusted under 35 U.S.C. 154(b) by 0 days.

(21) Appl. No.: 14/125,315

(22) PCT Filed: Dec. 20, 2012

(86) PCT No.: PCT/KR2012/011144
§ 371 (c)(1),
(2) Date: Dec. 11, 2013

(87) PCT Pub. No.: WO2013/176362
PCT Pub. Date: Nov. 28, 2013

(65) Prior Publication Data
US 2014/0111812 A1    Apr. 24, 2014

(30) Foreign Application Priority Data

May 22, 2012 (KR) .......... 10-2012-0054110
Aug. 21, 2012 (KR) .......... 10-2012-0091081

(51) Int. Cl.
*G01B 11/24*    (2006.01)
*G01B 11/25*    (2006.01)
*G01S 17/89*    (2006.01)
*G01S 17/42*    (2006.01)
*G01S 17/87*    (2006.01)
*G01S 7/481*    (2006.01)

(52) U.S. Cl.
CPC .............. *G01B 11/25* (2013.01); *G01S 7/4813* (2013.01); *G01S 7/4814* (2013.01); *G01S 17/42* (2013.01); *G01S 17/87* (2013.01); *G01S 17/89* (2013.01)

(58) Field of Classification Search
CPC ................. G02B 27/017; G02B 2027/0178; G02B 27/0093; G02B 2027/014; G02B 2027/0187; G02B 2027/0118; G02B 27/0172; G02B 5/30; G02B 2027/0138; G02B 27/0176; G02B 2027/0127; G02B 2027/0132; G02B 27/0149
See application file for complete search history.

(56) References Cited

U.S. PATENT DOCUMENTS 5,870,220 A * 2/1999 Migdal et al. ............. 359/216.1
2002/0059042 A1 * 5/2002 Kacyra et al. ............... 702/152
(Continued)

FOREIGN PATENT DOCUMENTS

JP    09-297014 A    11/1997
JP    2002-090456 A    3/2002
(Continued)

*Primary Examiner* — Michael P Stafira
(74) *Attorney, Agent, or Firm* — Revolution IP, PLLC

(57) ABSTRACT

Disclosed are a 3D laser scanning system and a method of obtaining a 3D image by using the system that detect, with a linear array type photo detector, a reflected light reflected from a target after rotation-emitting a line-shaped pulsed laser light through 360 degrees and obtain a 3D image through point cloud data obtained by measuring a distance to the target.

18 Claims, 6 Drawing Sheets

(56) References Cited

U.S. PATENT DOCUMENTS

| | | |
|---|---|---|
| 2003/0164952 A1* | 9/2003 | Deichmann et al. .......... 356/603 |
| 2007/0040121 A1* | 2/2007 | Kalayeh ........................ 250/342 |
| 2008/0123170 A1* | 5/2008 | Reichert et al. ............... 359/226 |
| 2008/0186470 A1* | 8/2008 | Hipp ............................. 356/5.08 |
| 2010/0020306 A1 | 1/2010 | Hall |
| 2013/0027715 A1 | 1/2013 | Imaki et al. |

FOREIGN PATENT DOCUMENTS

| | | |
|---|---|---|
| JP | 2006-023083 A | 1/2006 |
| WO | WO2011/138895 A1 | 11/2011 |

* cited by examiner

ANGULAR
RESOLUTION 0.42°

ANGULAR
RESOLUTION 1.25°

OVERLAP PART ANGUL
RESOLUTION 0.36°

3D SCANNING SYSTEM AND METHOD OF OBTAINING 3D IMAGE

CROSS REFERENCE TO PRIOR APPLICATIONS

This application is a National Stage Application of PCT International Patent Application No. PCT/KR2012/011144 filed on Dec. 20, 2012, under 35 U.S.C. §371, which claims priority to Korean Patent Application Nos. 10-2012-0054110 filed on May 22, 2012 and 10-2012-0091081 filed on Aug. 21, 2012, which are all hereby incorporated by reference in their entirety.

TECHNICAL FIELD

The present invention relates to a 3D laser scanning system and a method of obtaining a 3D image that detect, with a linear array type photo detector, a reflected light from a target after emitting a line-shaped pulsed laser light through 360 degrees and generating a 3D image through point cloud data obtained by calculating a distance to the target.

More particularly, the present invention relates to a 3D laser scanning system and a method of obtaining a 3D image by using the system that may obtain wide-angle data in a short distance and long distance data having an excellent vertical resolution without raising an optical output in a long distance by configuring the line-shaped pulsed laser light and the linear array photo detector at different field of views and a symmetric alignment.

BACKGROUND ART

A 3D image sensor called light detection and ranging (LIDAR) or laser detection and ranging (LADAR) is a system that may catch the reflected light energy from a target after emitting a pulsed laser light with a light detection element, convert the light energy into an electrical signal and thus calculate a distance to the target or the moving speed of the target.

A LIDAR system is being widely applied to various fields such as a sensor for detecting a forward obstacle of a robot or unmanned vehicle, a laser gun for measuring a speed of a moving object, an airborne geo-mapping device, 3D terrain scanning device, underwater scanning device, etc.

Recently, the application field of the LIDAR system is being expanded to an advanced driver assistance system that warns a driver or reduces the speed of a vehicle if an emergency situation due to a forward obstacle or a side obstacle occurs, or to an autonomous driving system such as an unmanned ground vehicle or tractor.

In order to apply a LIDAR system for recognizing the forward environment of a vehicle, unmanned tractor, or robot that runs at a high speed, it is needed to obtain 3D dense point cloud information that has a wide field of view.

As a technology for obtaining 3D point cloud data of a wide field of view, US patent publication No. 2010-0020306 discloses a high definition LIDAR system that consists of plenty of laser diodes, multiple detectors (or a single detector) detecting the reflected and retuned beam, a housing fixed with above photo elements and lenses, and a rotary unit rotating the housing through 360 degrees at a high speed.

The entire group of the multiple laser diodes that are arranged in the LIDAR system are arranged at different angles and thus laser beams are to be spread at a certain vertical angle, such as 40 degrees. Thus, it is possible to obtain point cloud data on x, y, and height, such as 3D data.

In addition, the system includes a first assembly that is installed in a horizontal direction in order to obtain appropriate data related to height, and a second assembly that is arranged at a slight downward angle as compared to the first assembly. The first assembly obtains long-distance point cloud data as compared to the second assembly, and the second assembly may obtain information around a running vehicle, such as short-distance point cloud data, due to an angle arrangement.

In case of the first assembly, in order to obtain point cloud data on a long distance, it is needed to increase the laser output power, accordingly which leads to drawbacks in that the volume of a whole sensor increases and the cost of a unit sensor rises.

Moreover, since the space between point cloud data becomes larger as a distance becomes long, the LIDAR system has a drawback in that a point cloud data obtained from a long distance object has low vertical resolution and thus the reliability of its processed data also decreases. Most of all, since 32 or 64 laser diodes are individually installed, emission angles are different and thus it is difficult to precisely calibrate a laser diode and a corresponding photo detector individually.

Moreover, since a general 3D laser scanning system has a structure in which both a laser source and a light transmitting/receiving unit are installed and rotated in a rotation-driving device, a rotary motor having great capacity is needed due to the weight of a laser source and a cooling structure for cooling the laser source and thus there are drawbacks in that the manufacturing cost of a scanning system increases and its volume increases as well.

DISCLOSURE OF THE INVENTION

Technical Problem

The present invention is devised to solve the typical problems described above. The first objective of the present invention is to provide a 3D scanning system that may solve drawbacks occurring when using typical multiple laser diodes and solve drawbacks in that the volume of a device increases and precise calibration is difficult.

Moreover, the second objective of the present invention is to provide a 3D scanning system that may obtain wide-angle data in a short distance, obtain long-distance data having excellent vertical resolution without raising a light output in a long distance, and thus be appropriately used for a vehicle running at a high speed, an assisting device for an agricultural machine, or a unmanned vehicle such as an intelligent robot or intelligent transportation system.

Moreover, the third objective of the present invention is to provide a 3D laser scanning system that may obtain wide-angle data in a short distance, obtain data having excellent vertical resolution in a long distance with the same laser output power as that in the short distance, be appropriately used for a vehicle running at a high speed, an assisting device for an agricultural machine, or a unmanned device such as an intelligent robot, be manufactured at low costs and achieve a decrease in size.

Moreover, the fourth objective of the present invention is to provide a method of obtaining a 3D image that have reliable 3D point cloud data for short and long distances without raising a laser output power.

Technical Solution

A first aspect of the present invention for solving the first objective is to provide a 3D scanning system emitting a line-shaped pulsed laser light with horizontal rotation, detecting a light reflected from a target, and generating a 3D image through point cloud data obtained by calculating the distance to the target, the 3D scanning system including a laser power source generating a pulsed laser light, one or more light transmitting and receiving modules comprising light transmitter that emits the pulsed laser light to the outward in a vertical line shape, and a photo detector that detects the reflected pulsed laser light and converts it into an electrical signal; and a motor rotating one or more light transmitting and receiving modules. A light emission angle of at least one of the two or more light transmitting and receiving modules is set differently from that of the other light transmitting and receiving module.

The second aspect of the present invention for solving the second objective is to provide a 3D scanning system emitting a line-shaped pulsed laser light, detecting a light reflected from a target, and generating a 3D image through point cloud data obtained by calculating the distance to the target, the 3D scanning system including a laser source emitting a pulsed laser light, two or more light transmitting and receiving modules comprising a light transmitter that emits the pulsed laser light to the outside in a vertical line shape, and a photo detector that detects and converts the reflected pulsed laser light into an electrical signal; and a driving motor rotating the two or more light transmitting and receiving modules; and wherein a light emission angle of at least one of the two or more light transmitting and receiving modules is different from that of the other light transmitting and receiving module.

For the 3D scanning system according to the first or second aspect of the present invention, the light transmitter may include a collimator that aligns the optical axis of the pulsed laser light provided from the laser source and a lens that makes the light passing through the collimator a line light, the photo detector may include a lens that focuses the reflected light, a filter that filters the reflected light, and a linear array type photo detector that generates an electrical signal from the filtered light.

For the 3D scanning system according to the second aspect of the present invention, the light transmitting and receiving modules may include a first light transmitting and receiving module and a second light transmitting and receiving module that are arranged to allow light transmission and reception to be performed in opposite directions.

For the 3D scanning system according to the second aspect of the present invention, the light emission angle of the first light transmitting and receiving module may be two or more times larger than the light emission angle of the second light transmission and reception module.

For the 3D scanning system according to the second aspect of the present invention, the light emission angle of the first light transmitting and receiving module may be larger than the light emission angle of the second light transmission and reception module, and the light emission angle of the second light transmitting and receiving module may be set to maintain a light emission angle that is sufficient to cover a predetermined height in a detection limit distance of the first light transmitting and receiving module.

For the 3D scanning system according to the first or second aspect of the present invention, the laser source may be installed to correspond to the number of the light transmitting and receiving modules.

A third aspect of the present invention for solving the third objective is to provide a 3D scanning system emitting a line-shaped pulsed laser light, detecting a light reflected from a target, and generating a 3D image through point cloud data obtained by calculating the distance to the target, the 3D scanning system including a fixed part and a rotating part that is coupled to the upper part of the fixed part, wherein the fixed part comprises a motor for driving the rotating part and a laser source for generating the pulsed laser light, and the rotating part comprises a rotary power supplying device coupled to the motor, a light splitting module that splits the pulsed laser light into two or more pulsed laser lights, and two or more light transmitting and receiving modules that comprise a photo transmitter that emits the split pulsed laser light to the outside in a vertical line shape and a photo detector that detects and converts the reflected pulsed laser light into an electrical signal.

For the 3D scanning system according to the third aspect of the present invention, a light emission angle of at least one of the two or more light transmitting and receiving modules may be different from that of the other light transmitting and receiving module.

For the 3D scanning system according to the third aspect of the present invention, a pulsed laser light generated from the laser source may be emitted upwardly through the cavity formed in the central part of the rotating part and reach the light splitting module.

For the 3D scanning system according to the third aspect of the present invention, the motor may be a hollow shaft motor, and a hollow type multi-contact slip ring may be arranged on the hollow shaft motor to supply power to the rotating part.

For the 3D scanning system according to the third aspect of the present invention, the rotating part may further include a cover having two or more windows to emit the pulsed laser light, and a separating unit fixed to the cover and holding the two or more light transmitting and receiving modules. The separating unit may include a through hole for passing the pulsed laser light and the light splitting module may be arranged near the through hole.

For the 3D scanning system according to the third aspect of the present invention, the light splitting module may include a support fixed to the separating unit and including the through hole for passing the pulsed laser light, a beam splitter arranged on the through hole of the support and splitting the pulsed laser light, and a plurality of mirrors fixed to the support and guiding a split pulse laser to a predetermined path.

For the 3D scanning system according to the third aspect of the present invention, the light transmitting and receiving module may include a light transmitting module and a light receiving module, and the light transmitting module may include a plurality of lenses that makes a pulsed laser light provided from the light splitting module to be a vertical line shape.

For the 3D scanning system according to the third aspect of the present invention, the light transmitting and receiving module may include a light transmitting module and a light receiving module, and the light receiving module may include a lens focusing a reflected light and a light processing unit that comprises a filter filtering a light passing through the lens and a linear array photo diode generating an electrical signal from a filtered light.

For the 3D scanning system according to the third aspect of the present invention, the two or more light transmitting and receiving modules may include a first light transmitting and receiving module and a second light transmitting and receiving module, and the first and second light transmitting and receiving modules may be symmetrically arranged to allow emission and reception of the pulsed laser light to be performed in opposite directions.

For the 3D scanning system according to the third aspect of the present invention, the light emission angle of the first light transmitting and receiving module may be two times larger than the light emission angle of the second light transmitting and receiving module.

For the 3D scanning system according to the third aspect of the present invention, the light emission angle of the first light transmitting and receiving module may be larger than the light emission angle of the second light transmission and reception module, and the light emission angle of the second light transmitting and receiving module may be set to maintain a light width that is sufficient to cover a certain height set to a 3D laser scanning system in a detection limit distance for the reflected light of the first light transmitting and receiving module.

For the 3D scanning, system according to the third aspect of the present invention, the rotating part may include a control board that may include a controller for controlling the whole sensor system and a data processing module for generating 3D image data.

For the 3D scanning system according to the third aspect of the present invention, the control board further may include a wireless communicating unit for delivering generated 3D image data to the user.

A fourth aspect of the present invention for solving the fourth objective is to provide a method of obtaining a 3D image by emitting a line-shaped pulsed laser light, detecting a light reflected from a target, and generating a 3D image through point cloud data obtained by calculating the distance to the target, the method including emitting two or more vertical line-shaped pulsed laser lights by using two or more light transmitters that are arranged at equal angles, wherein a light emission angle of at least one of the two or more vertical line-shaped pulsed laser lights is emitted differently from a light emission angle of the other pulsed laser light.

For the method of obtaining the 3D image according to the fourth aspect of the present invention, the number of the light transmitter may be two and the light transmitters may be arranged to allow pulsed laser lights to be emitted in opposite directions.

Advantageous Effects

A 3D laser scanning system according to a first aspect of the present invention may have a remarkably high scanning speed and a small volume as compared to a scanning system that uses a multi-array laser source by enabling line-shaped laser pulse lights to be emitted at one time and detecting the lights reflected from a, target by using a linear array photodiode.

A 3D laser scanning system and a 3D scanning method according to second and fourth aspects of the present invention uses a narrow-angle line laser in sensing a long distance and a wide-angle line laser in sensing a short distance. Since it is possible to secure a wide field of view in a short distance and obtain dense point cloud data in a long distance, therefore, it is possible to obtain data having excellent vertical resolution. Moreover, according to the present invention, since there is no need for a high-output laser to be used for a long distance and the same laser output power may be used for a long distance and a short distance, driving may be performed with a single output and thus the present invention is useful for decreasing the volume of a 3D scanning system.

Moreover, a 3D scanning system according to a third aspect of the present invention is designed to rotate only a light transmitting and receiving module by separating a laser source generating a line laser and its cooling unit from the light transmitting and receiving module that emits a light, detects a reflected light, and generates point cloud data so that a lighter and more compact system may be realized as compared to a typical 3D scanning system—.

MODE FOR CARRYING OUT THE INVENTION

Figure 1:
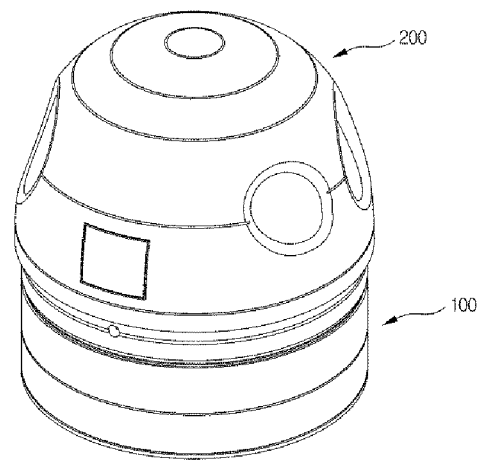
FIG. 1 is a perspective view of a 3D scanning system according to an embodiment of the present invention.
Figure 2:
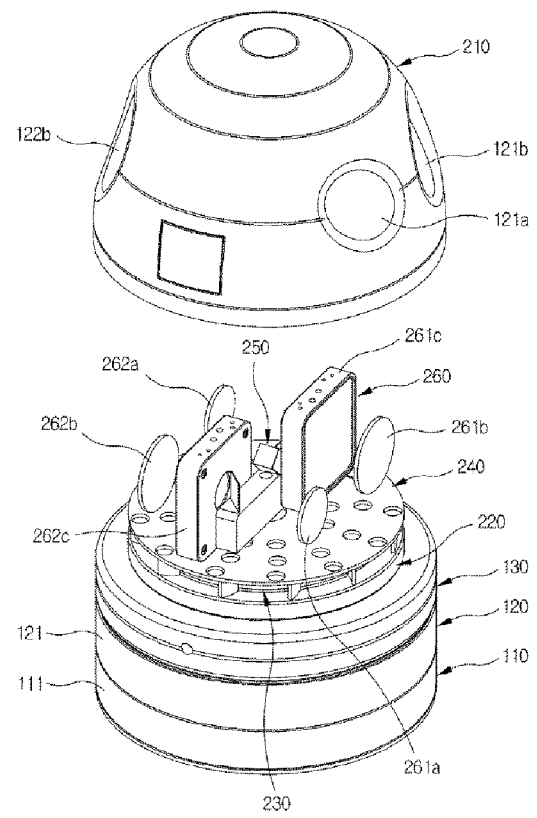
FIG. 2 is an exploded perspective view for a cover of a 3D scanning system according to an embodiment of the present invention.

Exemplary embodiments will be described below in detail on the basis of exemplary embodiments of the present invention with reference to the accompanying drawings.

Moreover, the terms or words used in the specification and claims should not be construed as typical and denotative meanings but be construed as meanings and concepts that match the technical spirit of the present invention on the basis of a principle that inventors may properly define the concepts of the terms in order to describe their invention in a best way. Thus, since the embodiments described in the specification and the configurations shown in the drawings are just exemplary embodiments of the present invention and do not thoroughly represent the technical spirit of the present invention, there may be, when filing this application, various equivalents and variations that may replace the embodiments and the scope of the present invention are not limited to the following embodiments.

A 3D laser scanning system according to the present invention relates to a 3D laser scanning system and a method of generating a 3D image by using the system that detect, with a linear array type photo detector, a reflected light reflected from a target after emitting a line-shaped pulsed laser light and generate a 3D image through point cloud data obtained by calculating a distance to the target. The scanning system includes a fixed part 100 and a rotating part 200 that is rotatably coupled to the fixed part 100. The fixed part 100 includes a power supply 110, a laser source 120 generating pulsed lights, and a hollow shaft motor 130 that drives the rotating part 200. The rotating part 200 includes a cover 210, a hollow type multi-contact slip ring 220 coupled to the motor 130, a plurality of control boards 230 that are arranged on the hollow type multi-contact slip ring 220, a separating unit 240 that protects and separates the control boards 230, a light splitting module 250 and a light transmitting and receiving module 260 that are arranged on the separating unit 240.

Figure 3:
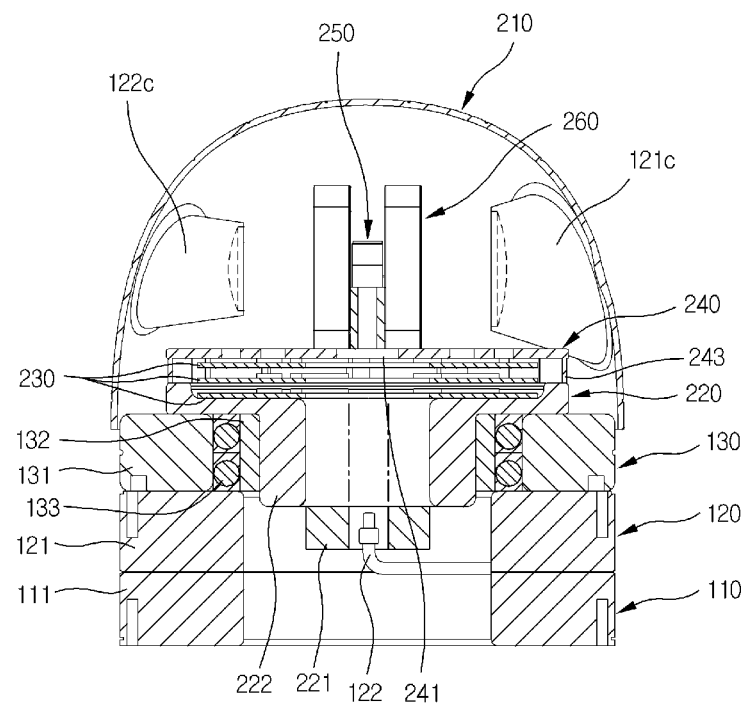
FIG. 3 is a cross-sectional view of a 3D scanning system according to an embodiment of the present invention.
Figure 4:
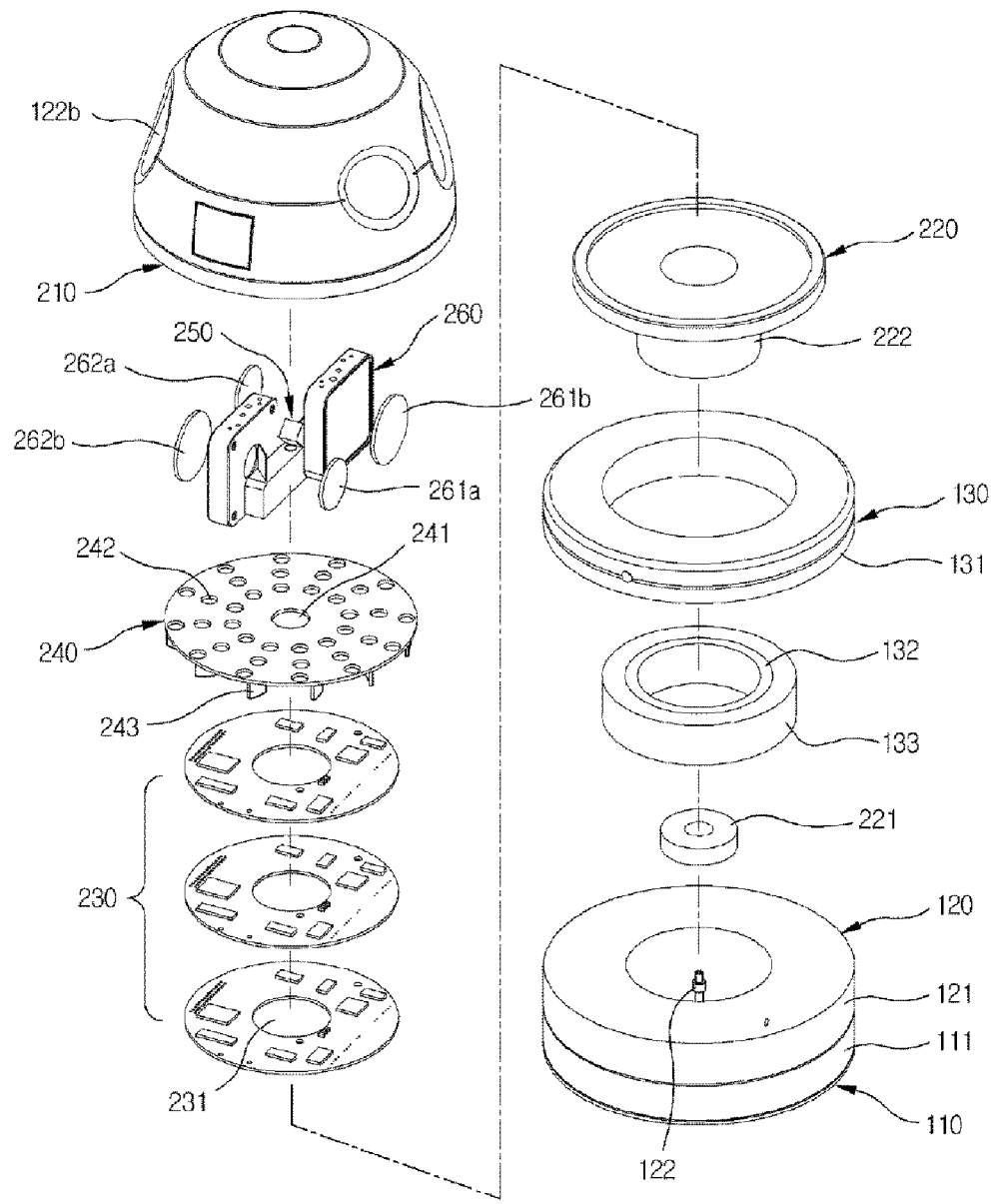
FIG. 4 is an exploded perspective view of a 3D scanning system according to an embodiment of the present invention.

The power supply 110 installed in a ring-shaped first case 111 as shown in FIGS. 3 and 4 includes a main control power supply that receives power from an external power supply (for example, 24V power supply) and supplies the power to various electrical devices, and a high-voltage transformer for providing high-voltage power to the laser source 120.

The laser source 120 is arranged in a hollow ring-shaped second case 121 as shown in FIG. 3 and a light emission unit 122 is formed to protrude into the second case 121 and be upwardly curved so that a generated pulse laser is emitted upwardly through the central part of the case 121. Moreover, a light focusing lens is attached to the light emission unit 122 and thus a laser emitted from the laser source 120 may be focused and emitted upwardly without dispersion. On the other hand, the second case 121 may include a cooling device (not shown) for cooling heat that is generated from the laser source 120, and for example, it is possible to cool heat by forming a plurality of cooling fins on the external circumferential surface of the second case.

A hollow shaft motor is used as the motor 130. The hollow shaft motor includes a ring-shaped stator 131 and a hollow multi-contact slip ring 220 that is installed in the stator 131, interacts and rotates with the stator, and has a hole. A light that is emitted from the laser source 120 through the hole in the hollow multi-contact slip ring 220 is emitted upwardly through the central part of the motor 130.

The cover 210 is formed of synthetic resin or metal and has a semi-sphere shape as shown in FIGS. 1 to 4. A first light emitting hole 121a and a second light emitting hole 122a that enable a pulsed laser light generated from the laser source 120 to be emitted in a line shape are respectively formed on both sides of the cover 210. A first light receiving hole 121b is near the first light emitting hole 121a for receiving a pulsed laser light that is emitted through the first light emitting hole 121a and reflected from a target. A second light receiving hole 122b is near the second light emitting hole 122a for detecting a pulsed laser light that is emitted through the second light emitting hole 122a and reflected from a target. On the other hand, the first light receiving hole 121b and the second light receiving hole 122b are formed more widely than the first light emitting hole 121a and the second light emitting hole 121a. Moreover, tubular extensions 121c and 122c may be formed in each of the first and second light emitting holes 121a and 122a and the first and second light receiving holes 121b and 122b so that an external soft material such as rain does not easily permeate them.

The hollow multi-contact slip ring 220 is coupled to a moving member 132 to be fixed to the moving member 132 that is installed in the motor 130, supports the control board 230 including a control circuit for controlling the system, supplies required power to each component of the rotating part 200 that needs power, and forms a data communication line for transmitting 3D image data generated from the control board 230 to an external calculating device. As shown in FIG. 4, hollow multi-contact slip ring 220 is formed as a multi-contact slip ring that has a central cavity hole. The hollow multi-contact slip ring 220 is divided into an upper part and a lower part. The lower part 221 is a part corresponding to the fixed portion of a slip ring and has a power cable connector for supplying required power to the rotating part 200 and a cavity to be able to transmit a pulsed laser light emitted from the laser source 120 to the rotating part. The central part of the cavity is aligned with the central part of the motor 130 so that a pulsed laser light emitted from the laser source 120 may be transmitted to the light splitting module 250 of the rotating part without interruption. The upper part 222 of the hollow multi-contact slip ring 220 is a part corresponding to the rotary portion of a slip ring and includes a data communication line that supplies power supplied from the fixed portion of the slip ring to each component of the rotating part 200 while rotating according to the rotation of the motor 130 and transmits 3D image data formed from the control board 230 to a user through the fixed portion.

If a mercury-type slip ring contact material is used, the hollow type multi-contact slip ring 220 may supply power at a rotation speed equal to or faster than 1200 RPM and stably transmit 3D image data equal to or higher than 20 Hz at a speed equal to or faster than 100 MHz.

The control board 230 includes a control circuit for controlling various units of a scanning system of the present invention and a 3D image data processing module. A first hole 231 for passing a laser is formed in the central part of the control board 231 and wiring is established in the control board 231 so that elements such as a high-performance controller and an encoder counter are installed to configure an electrical circuit to be able to generate a control signal for controlling the laser source 120, the light transmitting and receiving module 260, and the motor 130.

The separating unit 240 is installed on the control board 230 and holds the light transmitting and receiving module 260. A second hole 241 for passing a laser is formed in the central part of the separating unit and a plurality of fastening holes 242 are formed in the separating unit so that various components configuring the light transmitting and receiving module 260 are installed. Moreover, a plurality of fixing fins 243 is formed to protrude downwardly from the bottom of the separating unit 240 so that the separating unit may be fixed to the control board 230 at a certain interval.

Figure 5:
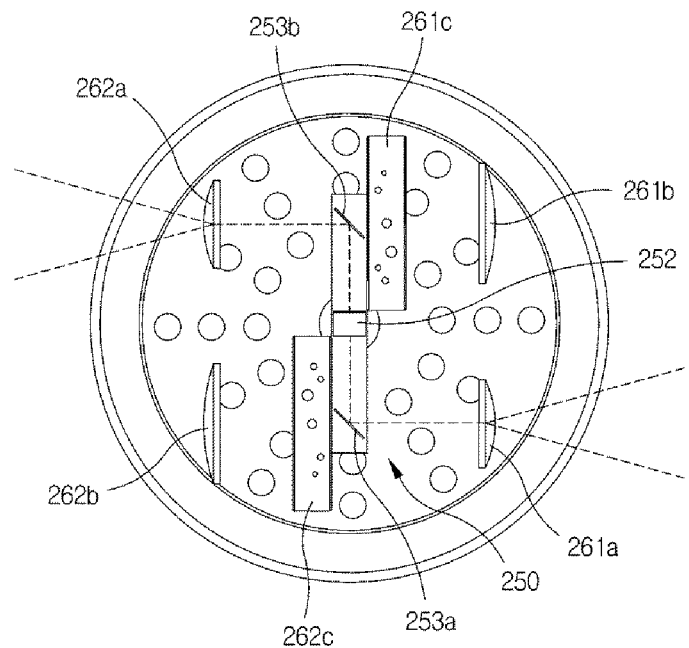
FIG. 5 is a plane view of a cover-free 3D scanning system according to an embodiment of the present invention.
Figure 6:
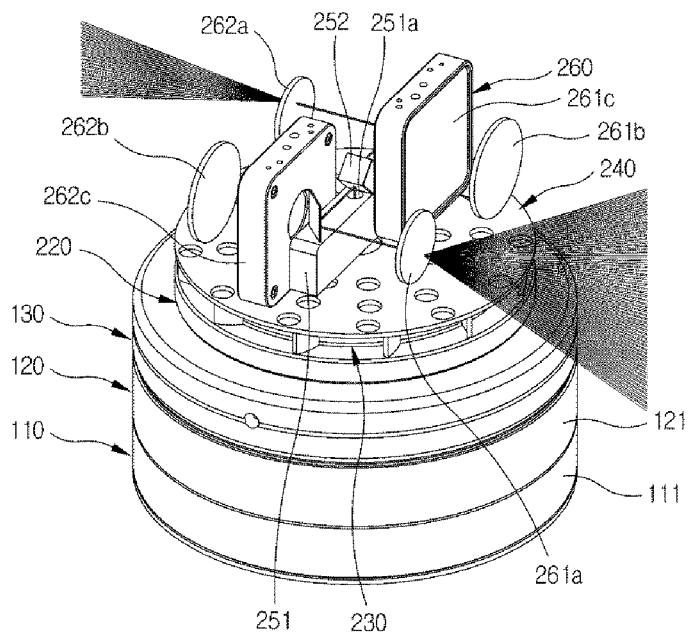
FIG. 6 is a perspective view of a cover-free 3D scanning system according to an embodiment of the present invention.

The light splitting module 250 is a unit for splitting, into two sub lights, a pulsed laser light emitted from the laser source 120 upwardly through the motor 130, the cavity of the hollow multi-contact slip ring 220, the first hole 231, and the second hole 232, and for guiding the two sub lights to a certain optical path. As shown in FIGS. 5 and 6, the light splitting module 250 includes a support 251 that has a rectangular parallelepiped shape and includes a through hole 251a for passing the pulsed laser light on its one side, a beam splitter 252 that is fixed to one side on the support 251 and splitting the pulsed laser light passing the through hole 251a into two beams, and first and second mirrors 253a and 253b that change an optical path so that two sub pulsed laser lights split from the beam splitter 252 is directed to the first light emitting hole 121a or the second light emitting hole 122a.

Although the embodiment of the present invention splits the pulsed laser light into two beams by using the light splitting module 250, it is possible to generate pulsed laser lights emitted in several directions, by not using the light splitting module 250 but only one laser source or two or more laser sources.

The light transmitting and receiving module 260 includes two light transmitting and receiving modules 261 and 262. The two light transmitting and receiving modules 261 and 262 include first and second line generator lenses 261a and 262a that convert lasers split through the light splitting module 250 into a line-shaped laser light, first and second light receiving lenses 261b and 262b receiving the pulsed laser light that is emitted through the first and second line generator lenses 261a and 262a, reflected and returned from a target, and first and second light processing units 261c and 262c that generate an electrical signal from a light passing through the first and second light receiving lenses 261b and 262b. On the other hand, after the light guided to the first and second line generator lenses 261a and 262a is spread, it is possible to selectively arrange a light focusing lens between the first and second line generator lenses 261a and 262a and the first and second mirror 253a and 253b.

Figure 7:
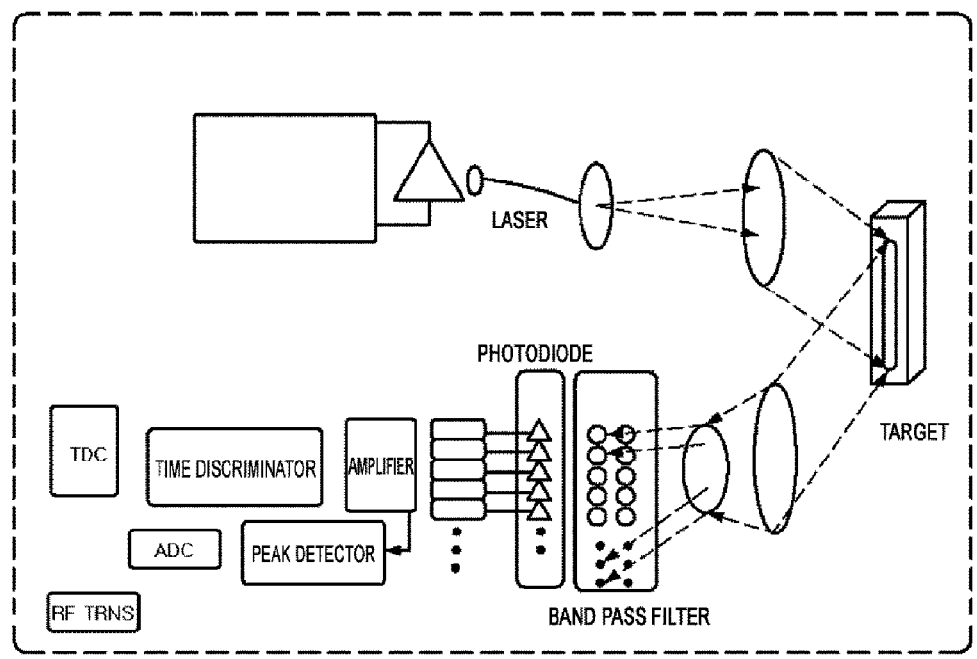
FIG. 7 is a block diagram of a light processing unit of a 3D scanning system according to an embodiment of the present invention.

Moreover, as shown in FIG. 7, the first and second light processing units 261c and 262c include a band pass filter, an array-type photodiode, an amplifier, a peak detector, an ADC, a time discriminator and a TDC. The band pass filter removes and inputs components having frequencies equal to or less than a specific value or components having frequencies equal to or greater than a specific value in order to minimize an impact on an external light such as sunlight. The array-type photodiode converts a light passing through the band pass filter into an electrical signal. The amplifier amplifies the electrical signal of the photodiode. The peak detector detects the peak of a laser light received from the electrical signal passing through the amplifier. The ADC calculates the intensity of a reflected light from the detection signal of the peak detector. The time discriminator for discriminating the input time of the reflected light from a signal amplified through the amplifier. The TDC measures the difference between the output time of the pulsed laser light and the input time of the reflected laser from information that is provided from the time discriminator. Moreover, the ADC and TDC data of the first and second light processing units 261c and 262c is transmitted to a 3D image processing module of the control board 230 to make 3D image data and such image data is configured to be transmitted to an external calculating device through a wireless transmitting and receiving unit such as an RF transceiver or a wired transmitting and receiving unit such as the data communication line of the hollow multi-contact slip ring 220.

In the embodiment of the present invention, it is possible to significantly raise a scanning speed by emitting vertical line shaped pulsed lasers at one time from one laser source by using the first and second line generator lenses 261a and 262a.

Moreover, although the embodiment of the present invention includes two light transmitting and receiving modules, the light transmitting and receiving modules may be arranged on the cover 210 in a circle. If there are three light transmitting and receiving modules, they may be arranged at an interval of 120 degrees and if there are four light transmitting and receiving modules, they may be arranged at an interval of 90 degrees. However, when considering the weight, volume, and manufacturing cost of a device, it is suitable when the number of the light transmitting and receiving modules is two and in this case, they may be arranged to have symmetry.

Moreover, the first and second line generator lenses 261a and 262a of the two light transmitting and receiving modules may be formed so that lights may be emitted at different angles. For example, if the light emission angle of one of the light transmitting and receiving modules is 40 degrees, the light emission angle of the other light transmitting and receiving module is set to 16 degrees. Here, the 'light emission angle' means an angle at which a light is spread in a direction perpendicular to the ground.

If the distance between a 3D scanning system and a target is short, it is relatively easy to analyze the target through data analysis because the vertical interval of point cloud data is maintained at some extent even if a laser emission angle is large. However, if the distance between the 3D scanning system and the target is long, for example, 200 m, there is a drawback in that the vertical resolution of point cloud data obtained therefrom significantly decreases since the distance between lights at a distance of 200 m from the 3D scanning system is very long even if a plurality of lights that a unit scanner may emit is dense.

Figure 8:
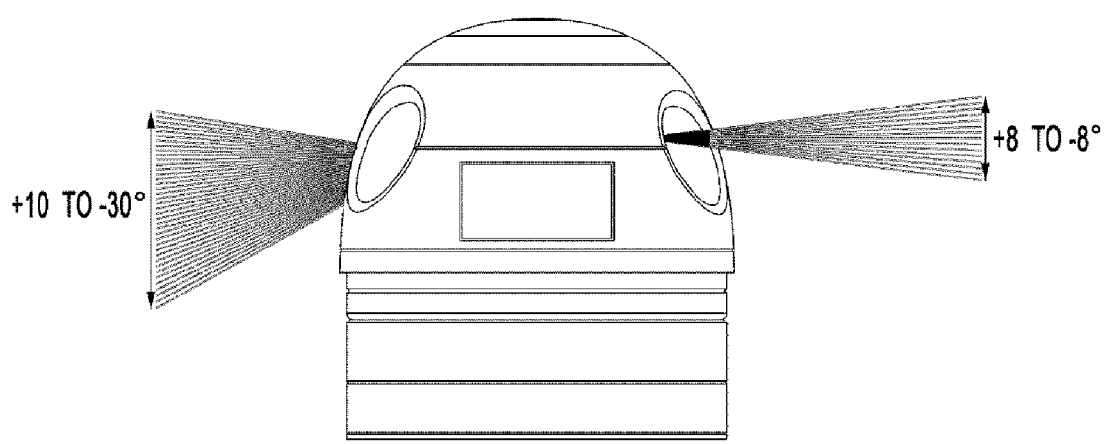
FIG. 8 is a diagram for showing lights emitted at different-type angles from a 3D scanning system according to an embodiment of the present invention.

However, if the pulsed laser emission angles of the two light transmitting and receiving modules 261 and 262 are differently set as in the embodiment of the present invention, it is possible to obtain, from a light spread widely such as at 40 degrees, the maximum vertical data range that may detect a target located at a short distance from the 3D scanning system as shown in FIG. 8. And it is possible to obtain, from a light spread narrowly such as at 16 degrees the minimum data density that may detect a target located at a long distance from the 3D scanning system as shown in FIG. 8. Thus, it is possible to prevent decreasing in the vertical resolution of the target, which is located at the long distance from the 3D scanning system, and thus it is possible to obtain reliable data for the long-distance target.

Moreover, if the light emission angle decreases, it is possible to use a laser having a low output (hereinafter, referred to as a low-output laser) to detect a target at long distance and furthermore, it is possible to use lasers having the same output at a long distance and at a short distance. Thus, the 3D scanning system according to the present invention has an advantage of raising vertical resolution and enabling a low-output laser to be used, as compared to a typical 3D scanning system using one-type laser light having a wide light emission angle.

Figure 9:
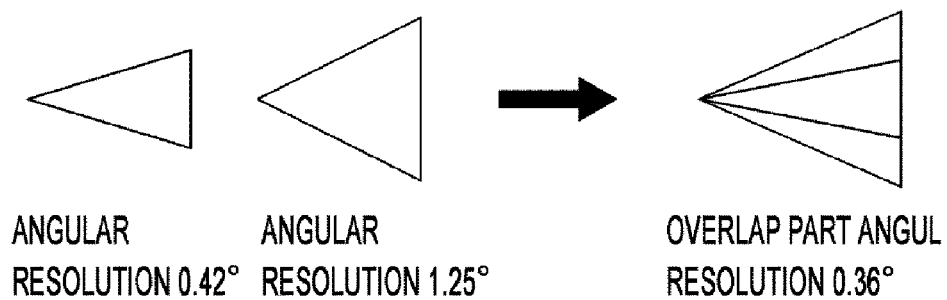
FIG. 9 is a diagram for explaining each resolution of lights emitted at different-type angles from a 3D scanning system according to an embodiment of the present invention, and for explaining each resolution of overlap parts.

Moreover, since even in the case of the short distance as shown in FIG. 9, a light transmitting and receiving module that emits a pulsed light at a wide angle has a light emission angle different from that of a light transmitting and receiving module that emits a pulse light at a narrow angle, there is an effect in that the density of point cloud data that may be obtained at an area where two lights overlap increases. Thus, an angular resolution is just 1.25 degrees in the case of a wide angle, and it is 0.42 degree even in the case of a narrow angle. The angular resolution is 0.36 degree and very excellent in the case of an overlap part. Thus, according to the embodiment of the present invention, there is an advantage in that it is possible to obtain an image having an excellent resolution in the middle of a short distance of a 3D image system.

In the following, the operation of a 3D scanning system that has the above-described configuration will be described in detail.

Power is supplied through the power supply 110 and the laser source 120, the motor 130, and the light transmitting and receiving unit 260 operate by the control circuit that is installed on the control board 230.

Firstly, if the motor 130 is driven, the rotating part fixed to the moving member 132 of the motor 130 rotation-drives and thus the rotating part 200 rotates, which includes the hollow type multi-contact slip ring 220, the control board 230, the separating unit 240, the light splitting module 250, the light transmitting and receiving module 260, and the cover 210.

Simultaneously, if a pulsed laser is generated from the laser source 120, the generated pulsed laser reaches the beam splitter 252 through the motor 130, the hollow multi-contact slip ring 220, the control board 230, the cavity of the separating unit 240, and the through hole 251a of the support 251 that configures the light splitting module 250. As shown in FIGS. 5 and 6, the pulsed laser is split into two lasers by the beam splitter 252, and each split pulsed laser changes in optical path through the first and second mirrors 253a and 253b, is dispersed at different light emission angles by the first and second line generator lenses 261a and 262a, and is emitted to the outside through the first and second light emitting holes 121a and 122a.

Although in the embodiment of the present invention, the light emission angles of the first and second line generator lenses 261a and 262a are respectively set to 40 degrees and 16 degrees, the light emission angle may be controlled according to the type of the point cloud data required for a scanning system.

The pulsed laser emitted in this way reaches a target and is reflected therefrom, the reflected pulsed laser enters a scanning system through the first and second light receiving holes 121b and 122b, and the incident pulsed laser is focused through the first and second light receiving lenses 261b and 261b and transmitted to the first and second light processing units 261c and 262c.

The first and second light processing units 261c and 262c respectively removes components equal to or lower than a specific frequency or components equal to or higher than a specific frequency from the detected pulsed laser through the band pass filter, converts a light passing through the band pass filter into an electrical signal, amplifies the electrical signal through the amplifier, detects a specific peak from the amplified electrical signal through the peak detector, calculates the intensity of a reflected pulse laser from the detection signal by using the ADC and simultaneously calculates the time of a reflected light from the amplified signal through the time discriminator and the TDC to generate point cloud data. The point cloud data generated in this way is provided to a calculating device for forming a 3D image.

The scanning system according to the embodiment of the present invention may obtain wide-angle point cloud data for a target located at a short distance from the scanning system, and raise the resolution of vertical point cloud data for a target located at a long distance from the scanning system as shown in FIG. 8. Thus, it is possible to maintain the densities of point cloud data of the long distance or the short distance at similar levels and thus raise the reliability of data that is obtained by processing the point cloud data.

On the other hand, if the angles of lights emitted from the light transmitting and receiving module are widely set, there is a drawback in that the detection distance of a reflected light that may be detected by using the same light source becomes also short because individual light is also spread to a wide area, there is often no reflected light detected in a long distance at the upper end part of a light source where the spreading angle of a light is great, other than the central part thereof because a light is emitted to the space, and too much unnecessary data is obtained from the lower end of the light source because illumination is performed on a part of the light source that is close to a sensor. Moreover, it is needed to raise the output of a laser in order to obtain data for a long distance, for example, equal to or longer than 200 m while widely maintaining the angle of an emitted light, and this leads to increase in volume and weight of a 3D scanning system and to a rise in manufacturing cost. However, if a light having a narrow emission angle is used for the central part of a region of interest to be detected as in the embodiment of the present invention, it is possible to increase the detection distance of a reflected light even with the same laser output. That is, it is possible to use a low-output laser in obtaining point cloud data for a long distance.

Figure 10:
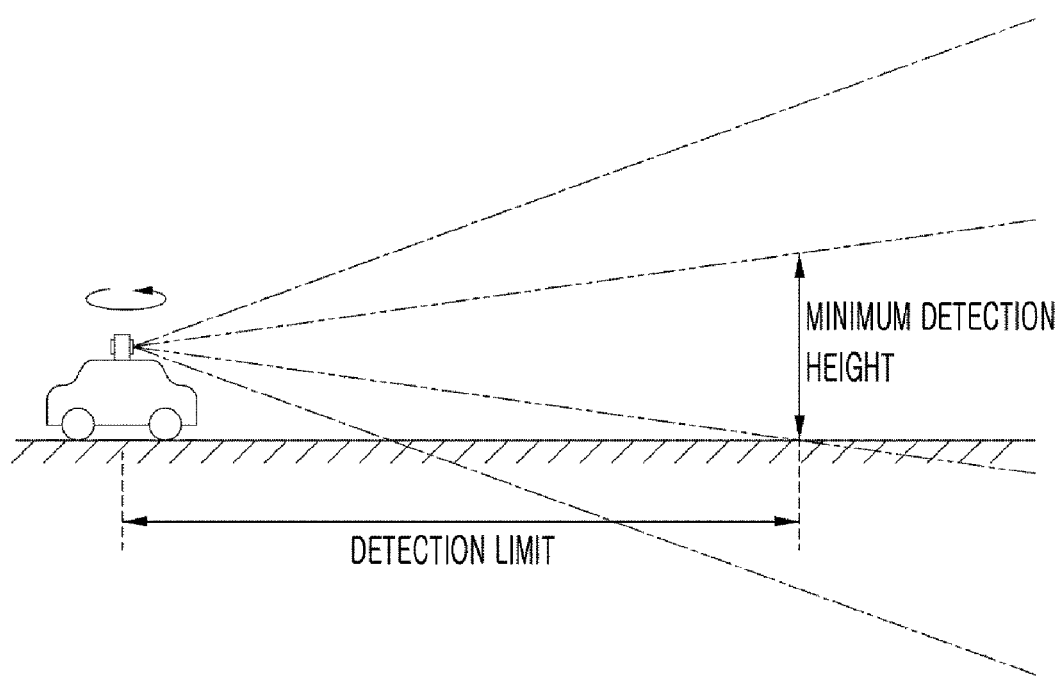
FIG. 10 is a diagram for explaining a method of setting a light emission angle of a 3D scanning system according to an embodiment of the present invention.

FIG. 10 is a diagram for explaining a process of controlling the angles of the first light transmitting and receiving module and the second light transmitting and receiving module.

As shown in FIG. 10, if the first light transmitting and receiving module is spread at a wide angle, a light detection limit becomes shorten than that of the second light transmitting and receiving module, and in this case, the second light transmitting and receiving module may be set to be able to maintain a light angle so that a minimum detection height required for a 3D scanning system at a light detection limit point may be covered.

As such, the scanning system according to the embodiment of the present invention may obtain reliable point cloud data by using a laser source having a low output by differently setting light emission angles. Moreover, by arranging, at the fixed part 100, a laser source 120 that has great volume and weight, forming cavities on each part that configures the rotating part 200, and transmitting a laser from the laser source 120 to the light transmitting and receiving unit 260 through the cavities, it is possible to decrease the volume of the motor 130 for driving the rotating part 200 and thus decrease the size of the motor 130.

Through such a configuration, it is possible to implement a 3D scanning system having lighter weight and a more compact size as compared to a typical 3D scanning system.

The invention claimed is:

1. A 3D scanning system emitting a line-shaped pulsed laser light, detecting a light reflected from a target, and generating a 3D image through point cloud data obtained by calculating the distance to the target, the 3D scanning system comprising:
   a laser source configured to emit a pulsed laser light;
   one or more light transmitting and receiving modules comprising a first light transmitting and receiving module and a second light transmitting and receiving module which respectively configured to emit the pulsed laser light having different spreading light angle to the outside in a vertical direction, a spreading light angle of the first light transmitting and receiving module is greater than a spreading light angle of the second light transmitting and receiving module according to a distance between the 3D scanning system and a target being detected, wherein the spreading light angle of the first light transmitting and receiving module is overlapped with the spreading light angle of the second light transmitting and receiving module due to rotation of the first and second light transmitting and receiving modules which are rotated by a driving motor;
   a photo detector configured to detect and convert the reflected pulsed laser light into an electrical signal; and
   a driving motor configured to rotate the one or more light transmitting and receiving modules.

2. A 3D scanning system emitting a line-shaped pulsed laser light, detecting a light reflected from a target, and generating a 3D image through point cloud data obtained by calculating the distance to the target, the 3D scanning system comprising:
   a laser source configured to emit a pulsed laser light;
   a first and a second light transmitting and receiving modules configured to emit pulsed laser light respectively having different transmitting light angles to the outside in a vertical direction according to a distance between the 3D scanning system and a target being detected, the transmitting light angle corresponding to the second light transmitting and receiving module is greater than the transmitting light angle corresponding to the first light transmitting and receiving module;
   a photo detector configured to detect and convert reflected pulsed laser light transmitted respectively from the first and a second light transmitting and receiving modules into an electrical signal; and
   a driving motor configured to rotate the first and second light transmitting and receiving modules, wherein the transmitting light angle of the first light transmitting and receiving module is overlapped with the transmitting light angle of the second light transmitting and receiving module due to rotations of the first and second light transmitting and receiving modules rotated by the driving motor.

3. The 3D scanning system of claim 1, wherein the first and second light transmitting and receiving modules comprise a collimator that aligns the optical axis of the pulsed laser light provided from the laser source; and a lens that makes the light passing through the collimator as a line shaped light, and the photo detector comprises a lens focusing the reflected light, a filter filtering the reflected light, and a linear array type photo detector that generates an electrical signal from the filtered light.

4. The 3D scanning system of claim 2, wherein the first and second light transmitting and receiving modules are arranged to allow light transmission and reception to be performed in opposite directions.

5. A system comprising:
a laser source configured to emit a pulsed laser light;
a first and a second light transmitting and receiving modules configured to emit pulsed laser light respectively having different transmitting light angles to the outside in a vertical direction according to a distance between the 3D scanning system and a target being detected, the transmitting light angle corresponding to the first light transmitting and receiving module is greater than the transmitting light angle corresponding to the second light transmitting and receiving module;
a photo detector configured to detect and convert reflected pulsed laser light transmitted respectively from the first and a second light transmitting and receiving modules into an electrical signal; and
a driving motor configured to rotate the first and second light transmitting and receiving modules, wherein
the transmitting light angle of the first light transmitting and receiving module is two or more times greater than the transmitting light angle of the second light transmission and reception module, and wherein the spreading light angle of the first light transmitting and receiving module is overlapped with the spreading light angle of the second light transmitting and receiving module due to rotations of the first and second light transmitting and receiving modules rotated by the driving motor.

6. The 3D scanning system of claim 4, wherein the light emission angle of the second light transmitting and receiving module is set to maintain a light emission angle that is sufficient to cover a predetermined height in a detection limit distance of the first light transmitting and receiving module.

7. The 3D scanning system of claim 1, wherein the laser source is disposed corresponding to the number of the light transmitting and receiving modules.

8. A 3D scanning system emitting a line-shaped pulsed laser light, detecting a light reflected from a target, and generating a 3D image through point cloud data obtained by calculating the distance to the target, the 3D scanning system comprising:
a fixed part and a rotating part that is coupled to the upper part of the fixed part, the fixed part comprising a motor configured to drive the rotating part and a laser source configured to generate the pulsed laser light, the rotating part comprising a rotary power supplying device coupled to the motor, and a light splitting module configured to slit the pulsed laser light into two or more pulsed laser lights, and
at least two or more light transmitting and receiving modules comprising a first light transmitting and receiving module and a second light transmitting and receiving module which respectively configured to emit split pulsed laser light having different spreading light angle to the outside in a vertical direction, a spreading light angle of the first light transmitting and receiving module is greater than a spreading light angle of the second light transmitting and receiving module according to a distance between the 3D scanning system and a target being detected, wherein the spreading light angle of the first light transmitting and receiving module is overlapped with the spreading light angle of the second light transmitting and receiving module due to rotations of the first and second light transmitting and receiving modules which are rotated by the rotating part; and
a photo detector configured to detect and convert the reflected pulsed laser light into an electrical signal.

9. The 3D scanning system of claim 8, wherein spreading light angle of at least one of the two or more light transmitting and receiving modules is different from spreading light angle of the each of the other light transmitting and receiving modules.

10. The 3D scanning system of claim 8, wherein a pulsed laser light generated from the laser source is emitted in a vertical direction through the cavity formed in the center of the rotating part to the light splitting module.

11. The 3D scanning system of claim 8, wherein the motor comprises a hollow shaft motor, and a hollow type multi-contact slip ring is arranged on the hollow shaft motor to supply power to the rotating part.

12. The 3D scanning system of claim 8, wherein the rotating part further comprises a cover having two or more windows to emit the pulsed laser light, and a separating unit fixed to the cover and holding the two or more light transmitting and receiving modules, and the separating unit comprises a through hole to pass the pulsed laser light and the light splitting module that is arranged near the through hole.

13. The 3D scanning system of claim 12, wherein the light splitting module comprises a support fixed to the separating unit, and the through hole is configured to pass the pulsed laser light, a beam splitter arranged on the through hole of the support and splitting the pulsed laser light, and a plurality of mirrors fixed to the support and guiding a split pulse laser to a predetermined path.

14. The 3D scanning system of claim 8, wherein the first and second light transmitting and receiving modules are symmetrically arranged to allow emission and reception of the pulsed laser light to be performed in an opposite direction each other.

15. The 3D scanning system of claim 8, wherein the rotating part comprises a control board that comprises:
a control module configured to control the whole sensor system; and
a data processing module configured to generate 3D image data.

16. The 3D scanning system of claim 15, wherein the control board further comprises a wireless communication unit configured to deliver generated 3D image data to a user.

17. The 3D scanning system of claim 2, wherein the first and second light transmitting and receiving modules comprise a collimator that aligns the optical axis of the pulsed laser light provided from the laser source; and a lens that makes the light passing through the collimator as a line shaped light, and the photo detector comprises a lens focusing the reflected light, a filter filtering the reflected light, and a linear array type photo detector that generates an electrical signal from the filtered light.

18. The 3D scanning system of claim 2, wherein the laser source is disposed corresponding to the number of the light transmitting and receiving modules.

* * * * *